United States Patent [19]

Schwärzler et al.

[11] Patent Number: 4,995,853
[45] Date of Patent: Feb. 26, 1991

[54] PLUNGING CONSTANT VELOCITY RATIO UNIVERSAL JOINT

[75] Inventors: Peter Schwärzler, Glattbach; Hans Wormsbächer, Dreieich; Rudolf Beier, Offenbach am Main, all of Fed. Rep. of Germany

[73] Assignee: Lohr & Bromkamp GmbH

[21] Appl. No.: 363,152

[22] Filed: Jun. 8, 1989

[30] Foreign Application Priority Data

Jun. 8, 1988 [DE] Fed. Rep. of Germany ....... 3819528

[51] Int. Cl.$^5$ .............................................. F16D 3/223
[52] U.S. Cl. .................... 464/144; 464/146; 464/906
[58] Field of Search ............... 464/15, 144, 145, 146, 464/906

[56] References Cited

U.S. PATENT DOCUMENTS

| | | | |
|---|---|---|---|
| 3,162,024 | 12/1964 | Breuer et al. | 464/146 |
| 3,162,026 | 12/1964 | Ritsema | 464/146 |
| 3,362,193 | 1/1968 | Ritsema . | |
| 3,368,370 | 2/1968 | Grauel | 464/146 |
| 3,452,558 | 7/1969 | Cull et al. | 464/146 |
| 3,464,232 | 9/1969 | Hutchinson | 464/146 |
| 3,928,985 | 12/1975 | Girguis | 464/144 X |
| 4,149,392 | 4/1979 | Kimberlin | 464/146 |
| 4,385,899 | 5/1983 | Franklin, Jr. | 464/146 |
| 4,533,339 | 8/1985 | Girguis | 464/146 |

FOREIGN PATENT DOCUMENTS

| | | |
|---|---|---|
| 1251595 | 10/1967 | Fed. Rep. of Germany . |
| 2015947 | 10/1971 | Fed. Rep. of Germany . |
| 2333779 | 1/1974 | Fed. Rep. of Germany . |
| 2702940 | 7/1977 | Fed. Rep. of Germany . |
| 1292854 | 10/1972 | United Kingdom . |

Primary Examiner—Daniel P. Stodola
Attorney, Agent, or Firm—Toren, McGeady & Associates

[57] ABSTRACT

A constant velocity ratio universal joint of plunging type, comprising an outer joint member (1), an inner joint member (2), facing pairs of tracks (3, 4) in the joint members receiving balls (5) for torque transmission, and a cage (6) constraining the balls and having first and second control surfaces (7, 9) with centers of curvature unequally off-set from the ball center plane I, in order to guide the balls to the bisect or plane, wherein the first control surface of the cage comprises two portions ($7_1$, $7_2$). The first portion ($7_1$) is part-spherical, and the second portion ($7_2$) is a surface of revolution about the axis of the cage of an arc of radius of curvature less than the radius of curvature of the part-spherical portion ($7_1$). The effect of the unequal off-set of the control surfaces of the cage is to compensate for axial thrusts on the balls when the joint is articulated, and the provision of the two portions of the first control surface has the effect of reducing such compensation with increasing articulation, thereby preventing possible jamming of the balls.

18 Claims, 5 Drawing Sheets

PLUNGING CONSTANT VELOCITY RATIO UNIVERSAL JOINT

BACKGROUND TO THE INVENTION

1. Field of the Invention

This invention relates to a plunging constant velocity ratio universal joint, comprising:

an outer joint member having an internal cylindrical surface provided with a number of tracks spaced circumferentially about a rotational axis of the joint member;

an inner joint member provided with a number of tracks spaced circumferentially about a rotational axis of the inner joint member, facing the tracks in the outer joint member in pairs;

a plurality of balls for torque transmission between the joint members, disposed one in each facing pair of said tracks;

and a cage having an axis and disposed between the joint members and holding the balls so that their centres lie in a ball centre plane, the cage having a first control surface which is in sliding engagement with the internal cylindrical surface of the outer joint member, and is a surface of revolution about the cage axis of a curved line with a centre of curvature axially offset from the ball centre plane, the cage further having a second control surface which is in sliding engagement with a surface associated with the inner joint member and is a surface of revolution about the cage axis of a curved line with a centre of curvature offset from the ball centre plane on the opposite side thereof from the first control surface, the said offset of the first control surface being greater than the said offset of the second control surface.

Such a plunging constant velocity ratio universal joint will hereafter be referred to as a joint of the kind specified. The effect of the offset of the first and second control surfaces of the cage from the ball centre plane is that, when the joint is articulated, the ball centre plane is caused to bisect the angle between the rotational axes of the joint members thereby making the joint a constant velocity ratio joint.

2. Description of Prior Art

A joint of the kind specified is disclosed in DE-PS-2323822 (GB 1431135). The unequal offset of the centres of curvature of the first and second control surfaces of the cage from the ball centre plane is provided to compensate for an effect which would occur as follows if they were equally offset. When the joint is articulated and is transmitting torque, the balls received in tracks which diverge from one another experience an axial thrust which tends to displace them in the direction in which the tracks diverge, so that they lose the ability to take full part in the transmission of torque. When the centres of curvature of the control surfaces of the cage are unequally offset, the cage is itself subjected to an increased turning moment which counteracts the axial thrust exerted on the balls as above described, so that all the balls take full part in torque transmission. A disadvantage of such a joint is that the difference between the offsets of the control surfaces of the cage has to be chosen as a compromise. If it is too small, the effect at small angles of articulation, i.e. the main operating range of the joint, is insufficient to counteract the above described loss in torque transmitting capacity, whereas, if the difference between the offset distances is too great, the effect is to cause the balls to become jammed at large angles of joint articulation, thereby limiting the operating range of the joint.

Further, with a known joint of the kind specified as above referred to, the cage is freely movable axially of the joint with the result that, in use, the cage tends to migrate to one or other end of its range of axial travel relative to the joint members. When this happens, the joint tends to transmit axial vibrations, which in theory the joint should not do because of its plunging ability.

SUMMARY OF THE INVENTION

It is the object of the present invention to provide a joint of the kind specified whereby at least the first above described disadvantage of the known joint is overcome or reduced.

According to the present invention, we provide a plunging constant velocity joint of the kind specified wherein the first control surface of the cage comprises a first portion, adjacent the ball centre plane, which is part-spherical, and a second portion extending from the first portion towards the end of the cage away from the ball centre plane, on which second portion all points are at distances from the cage axis less than the distances from the cage axis of corresponding points on a theoretical continuation of the first said surface portion towards the end of the cage.

By corresponding points, we mean points which are situated the same axial distance from the ball centre plane as the relevant points on the second portion of the first control surface. The theoretical continuation of the first said surface portion would be a part-spherical surface having the same radius and centre of curvature as the first said surface portion.

In a joint according to the invention, the moment acting on the cage and effective as described above to counteract the axial thrusts on the balls due to the different offsets from the ball centre plane of the first and second control surfaces of the cage, and which would be expected to increase with increasing joint articulation, is actually reduced with an increasing angle of joint articulation, in order to prevent the balls from becoming jammed at such large angles of articulation.

The second portion of the first control surface of the cage may be a surface of revolution about the axis of the cage of an arcuate line with a radius of curvature less than the radius of curvature of the first surface portion, and whose centre of curvature is the same axial distance from the ball centre plane as the centre of curvature of the first surface portion.

Preferably, the first portion of the first control surface extends as far as a plane, perpendicular to the cage axis, at which the distance of a point on said first portion from the cage axis is equal to the radius of curvature of said first portion, and the second portion of the first control surface extends from said plane as a continuation of said first portion.

In order to overcome the disadvantage above described, of the axial position of the cage relative to the joint members being undefined, so that the cage migrates to one or other end of its range of travel, a further feature of the invention is that there may be provided means for centering the cage relative to at least one of the joint members. Thus, the cage may either be centered relative to one of the joint members, or may be guided relative to both joint members in such a way as to centre it therebetween.

In one embodiment of invention described hereafter, there is provided spring means by which the cage is resiliently supported against movement in both axial directions relative to one of the joint members, preferably the inner joint member.

Alternatively, at least one track in a joint member may have a depth which decreases slightly towards the ends of the track, in order to centre the cage relative to the respective joint member.

A further alternative is that the centre lines of the tracks of at least one facing pair thereof in the inner and outer joint members may, in developed view of the joint, be equally and oppositely inclined to the joint axis. Another alternative is that the centre lines of the tracks of at least one facing pair thereof may lie in planes containing the axes of the respective joint members but be inclined to such axes so that they diverge from one another, either as straight lines or as curved lines whose curvatures are mirror images of one another.

In one embodiment of joint described hereafter, the second control surface of the cage comprises an internal part-spherical surface, engaging a complementary external part-spherical surface provided on an intermediate member of annular form, movable axially on a journal extending from the inner joint member.

In a second embodiment described hereafter, the cage is provided with a formation with a part-spherical external surface, engaging in an internal cylindrical formation of the inner joint member so as to be able to slide axially and articulate relative thereto.

Such a spherical formation provided in the cage may be engagable with a part-spherical abutment surface in the inner joint member, to act as a stop to limit axial movement of the cage in one direction relative to the inner joint member.

To limit axial movement of the cage in the opposite direction relative to the inner joint member, the cage may be provided at its other end with inwardly extending nose formations which have part-spherical surface portions, engagable with complementary part-spherical surface portions of the inner joint member between the tracks thereof. Assembly of the cage to the inner joint member is possible by fitting the cage in the axial direction to the inner joint member with the nose portions passing along the tracks, after which angular movement of the cage about the axis of the inner joint member enables the balls to be fitted in the cage.

The cage may be of sheet metal, of substantially constant wall thickness and of substantially undercutfree configuration. The cage may be provided with circumferentially spaced indentations which reach as far as the ball centres in order properly to support and guide the balls.

The cage may include radial tongues which are bent in opposite axial directions, and whose end faces are formed as portions of the second control surface of the cage.

Alternatively, the cage may be provided with a cylindrical portion having circumferentially distributed indentations which provide portions of the second control surface of the cage.

Such a sheet metal cage is generally of closed form, and therefore the invention provides that there may be apertures therein for flow of lubricant to allow lubricant to reach the second control surface of the cage.

BRIEF DESCRIPTION OF DRAWINGS

The invention will now be described by way of example with reference to the accompanying drawings, of which:

FIG. 1a is an enlarged detail of FIG. 1;

DESCRIPTION OF PREFERRED EMBODIMENTS

Figure 1:
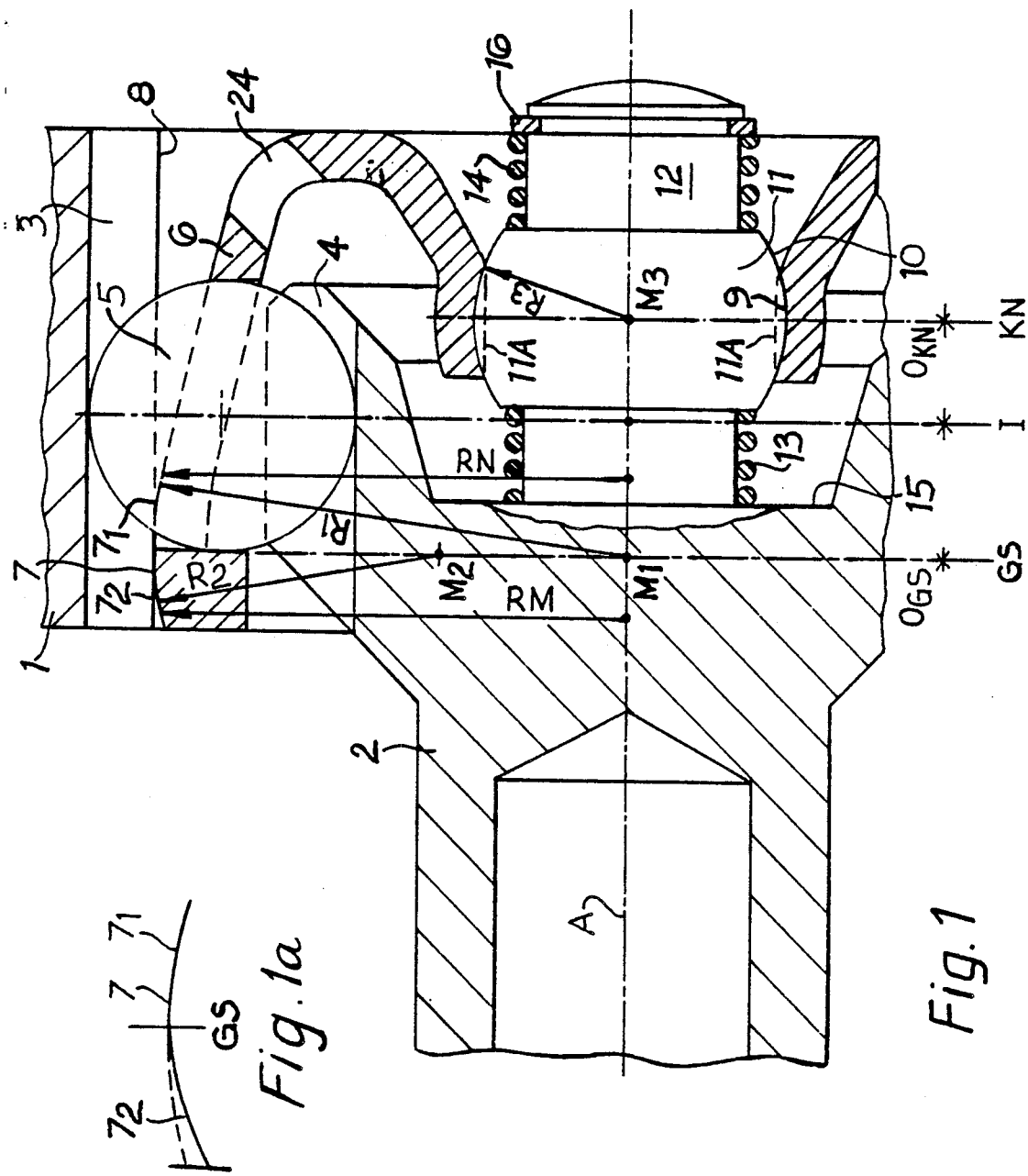
FIG. 1 is a view in longitudinal section of part of a first embodiment of joint according to the invention.

Referring firstly to FIG. 1, the joint there shown comprises an outer joint member 1 of hollow configuration, and an inner joint member 2 of which part is disposed within the outer joint member. The outer joint member 1 has an internal cylindrical surface 8 in which are provided a number of circumferentially spaced tracks 3 having centre lines which extend parallel to the rotational axis A of the outer joint member. The inner joint member is provided in its exterior with a number of tracks 4 which also have centre lines extending parallel to the rotational axis of the inner joint member, which as the joint is illustrated in the aligned (non-articulated) condition is also the axis A. The tracks 4 face the tracks 3 in the outer joint member in pairs, and a number of balls 5 are provided one in each facing pair of tracks 3, 4 for torque transmission between the joint members.

The balls 5 occupy apertures in a cage 6 which is disposed between the inner and outer joint members. The cage has a rotational axis which also, in an aligned joint, is the axis indicated as A. The cage 6 hold the balls 5 so that their centres lie in a plane I perpendicular to the rotational axis of the cage.

When the joint is articulated, the cage guides the balls 5 so that the ball centre plane bisects the angle between the rotational axes of the joint members. For this purpose, the cage is provided with a first, external, control surface 7 which is in two portions $7_1$ and $7_2$ and which engages the internal cylindrical surface 8 of the outer joint member. The cage further has a second control surface 9 which is an internal part-spherical surface, engaging a complementary part-spherical surface 10 provided on an intermediate element 11 which is axially slidable on a journal 12 extending from the inner joint member 2. The intermediate element 11 is caused by springs 13 and 14, disposed respectively between the intermediate element and a stop face 15 of the inner joint member, and between the intermediate element and a snap ring 16 adjacent the end of the journal 12, to assume a position approximately centred in its range of movement on the journal 12.

The first portion $7_1$ of the first control surface of the cage, closest to the ball centre plane I, is a part spherical surface, having a radius of curvature R1 and a centre of curvature M1 lying on the axis of the cage. The first surface portion $7_1$ extends as far as a plane GS perpendicular to the axis of the cage and containing the centre of curvature M1 of the first surface portion 7₁, i.e. to the plane at which the distance RN of a point on the surface portion from the axis of the cage is equal to the radius of curvature R1. The second portion 7₂ of the first control surface of the cage extends as a continuation of the first portion 7₁ to the end of the cage, and is a surface of revolution, about the axis of the cage, of an arcuate line having a radius of curvature R2 (less than R1) and centre of curvature M2 lying in the plane GS. The effect of this configuration of the second portion 7₂ of the first control surface of the cage is that the distance RM of any point on such surface from the cage axis A is less than the distance that a corresponding point on the surface would be if such surface were a theoretical continuation of the part-spherical first surface portion 7₁, i.e. than if the surface 7₂ were considered as having a centre of curvature M1 and radius of curvature R1. By corresponding points, we mean points which are the same distance as one another from the ball centre plane I (or from the plane GS, at which the second surface portion 7₂ starts and which is parallel to the plane I). FIG. 1a shows on an enlarged scale the difference between the configuration of the second surface portion 7₂ and the theoretical continuation (shown as a broken line) of the surface portion 7₁.

The second control surface 9 of the cage 6 is, as above referred to, part-spherical, with a radius of curvature R3 and centre of curvature M3 on the cage axis A. The plane perpendicular to the axis A and containing the centre of curvature M3 is indicated at KN. The planes GS and KN are offset axially to opposite sides of the ball centre plane I, and the offset OGS of the plane GS is greater than the offset OKN of the plane KN.

By virtue of the offsets OGS and OKN of the planes containing the centres of curvature of the control surfaces 7 and 9 of the cage, from the ball centre plane I, when the joint is articulated the ball centre plane is caused to bisect the angle between the rotational axes of the inner and outer joint members. The difference between the offset OGS and outer joint members. The difference between the offset OGS and OKN compensates, as above described, for the axial thrusts which the balls experience when the joint is transmitting torque. The provision of the second portion 7₂ of the first control surface 7 of the cage, has the result that the moment on the cage which compensates for the axial thrust on the balls, is reduced with increasing angle of joint articulation, thereby preventing the balls from becoming jammed at large joint angles.

The spring-controlled centering of the intermediate element 11 in its range of movement relative to the inner joint member prevents the above described problem of the cage migrating to one end of its range of movement in the joint. To facilitate assembly of the intermediate element 11 into the part of the cage having the surface 9, the element 11 may be provided with a pair of oppositely disposed flattened portions as shown at 11A, enabling the member to be turned through 90° about an axis lying in the plane KN, introduced into the cage part, then returned to its operative orientation.

Also visible in FIG. 1 is one aperture 24 of a number thereof in the cage, which provide access for lubricant to the intermediate member 11 and journal 3.

Figure 2:
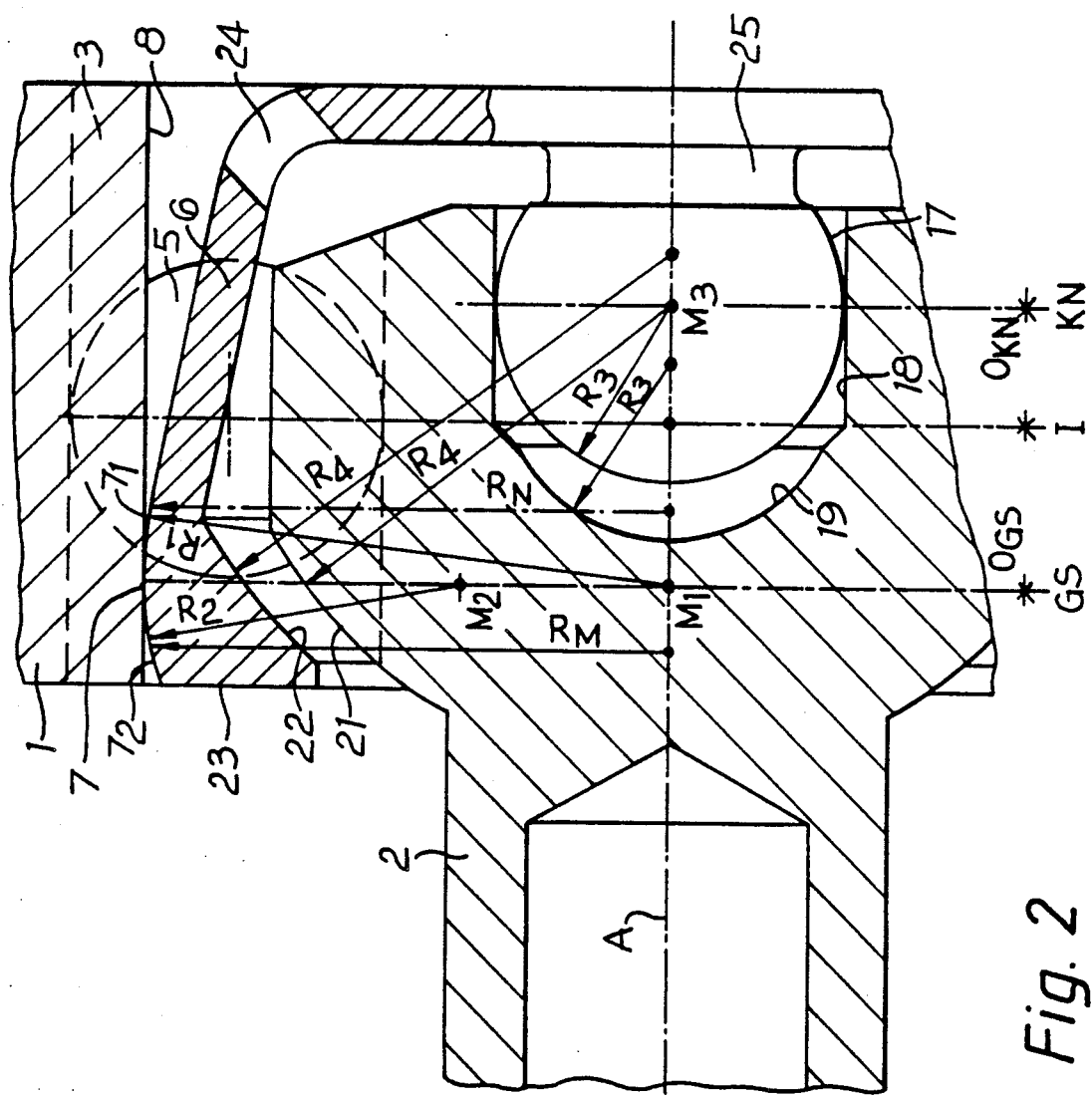
FIG. 2 is a view as FIG. 1, of a second embodiment of joint according to the invention.

Referring now to FIG. 2 of the drawing, this shows a further embodiment of joint wherein parts corresponding to those shown in FIG. 1 have been given the same reference numerals. Thus the joint comprises an outer joint member 1 and an inner joint member 2, having ball tracks 3, 4 whose centre lines extend parallel to the respective rotational axes of the joint members. Again, the joint is shown in the aligned condition and the rotational axes of the joint members and of the cage coincide and are indicated at A. The cage 6 holds balls 5 with their centres in a common plane I. The cage has an external first control surface which engages the internal cylindrical surface 8 of the outer joint member between the tracks 3 thereof, the first control surface of the cage having first and second parts 7₁ and 7₂ whose configuration, with radii of curvature R1, R2 and centres of curvature M1 and M2 in plane GS, are the same as those above described.

Differing from the embodiment of FIG. 1, the cage of the joint of FIG. 2 is provided with a spigot 25 having a head in the form of a truncated sphere with an external surface 17 of radius R3 and centre of curvature M3. The centre of curvature M3 lies in a plane KN, and planes GS and KN are offset from the ball centre plane I by differing offsets OGS and OKN as for the FIG. 1 embodiment.

The surface 17, which constitutes the second control surface of the cage, engages with an internal cylindrical surface 18 of the inner joint member. The inner joint member also has a part-spherical stop surface 19 whose radius of curvature R3 is equal to that of the surface 17, and with which the surface 17 is engagable to limit axial travel of the cage relative to the inner joint member in one axial direction.

At the exterior of the inner joint member, between the ball-receiving tracks 4 thereof, the inner joint member is provided with a part-spherical surface 21 of radius of curvature R4. The cage 6 is provided with complementary part-spherical surface portions 22, provided on inwardly extending nose formations 23 of the cage, engagable with the surface portions 21 of the inner joint member to limit axial travel of the cage in the opposite direction relative thereto. Assembly of the cage to the inner joint member is possible by fitting the cage axially to the inner joint member with the nose portions 23 passing along the tracks 4. Thereafter angular movement of the cage about the axis A relative to the inner joint member enables the balls to be fitted in the apertures they occupy in the cage, thus holding the nose portions 23 of the cage in alignment with the surface portions 21 between the tracks 4.

Figures 3A, 3B:
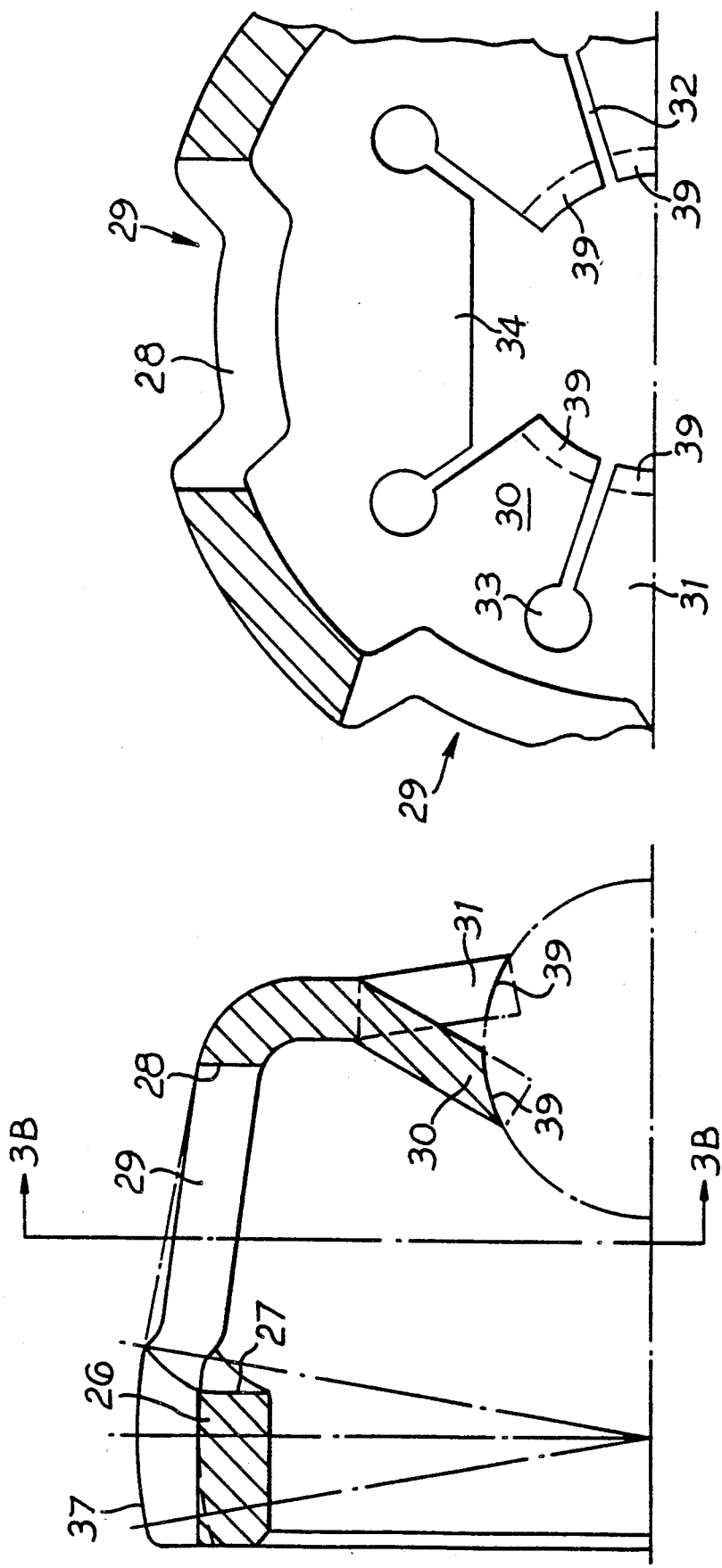
FIG. 3A and FIG. 3B are respectively longitudinal and transverse sections through part of an embodiment of cage for a joint according to the invention.

A cage for a joint according to the invention may be made of sheet metal, and FIGS. 3A and 3B show a possible configuration for such a cage. This is a cage which is intended to engage an intermediate member 11 as shown in the joint of FIG. 1.

The cage is made of sheet metal of substantially uniform thickness, generally in the form of a partially cup-shaped sleeve having apertures 29 for receiving the torque-transmitting balls of the joint. In one axial direction, apertures 29 are bounded by surfaces 28, and in the opposite direction by surfaces 27 provided on radially inwardly pressed indentations 26 which extend as far as the centres of the balls in order properly to support the balls. Between the indentations 26, the cage has its first control surface 37 which comprises first and second portions as above described.

At its opposite end, the cage has oppositely bent tongues 30, 31 which are separated by slots 32 with relief apertures 33. The tongues 30, 31 are provided with parts of the part-spherical second control surface 39 of the cage engagable with an intermediate member as the intermediate member 11. An opposite pair of tongues 34 are shortened to provide recesses through which the intermediate member 11 can be introduced into the cage when turned at 90° from its operative position, as shown in outline in FIG. 3A.

Figure 5:
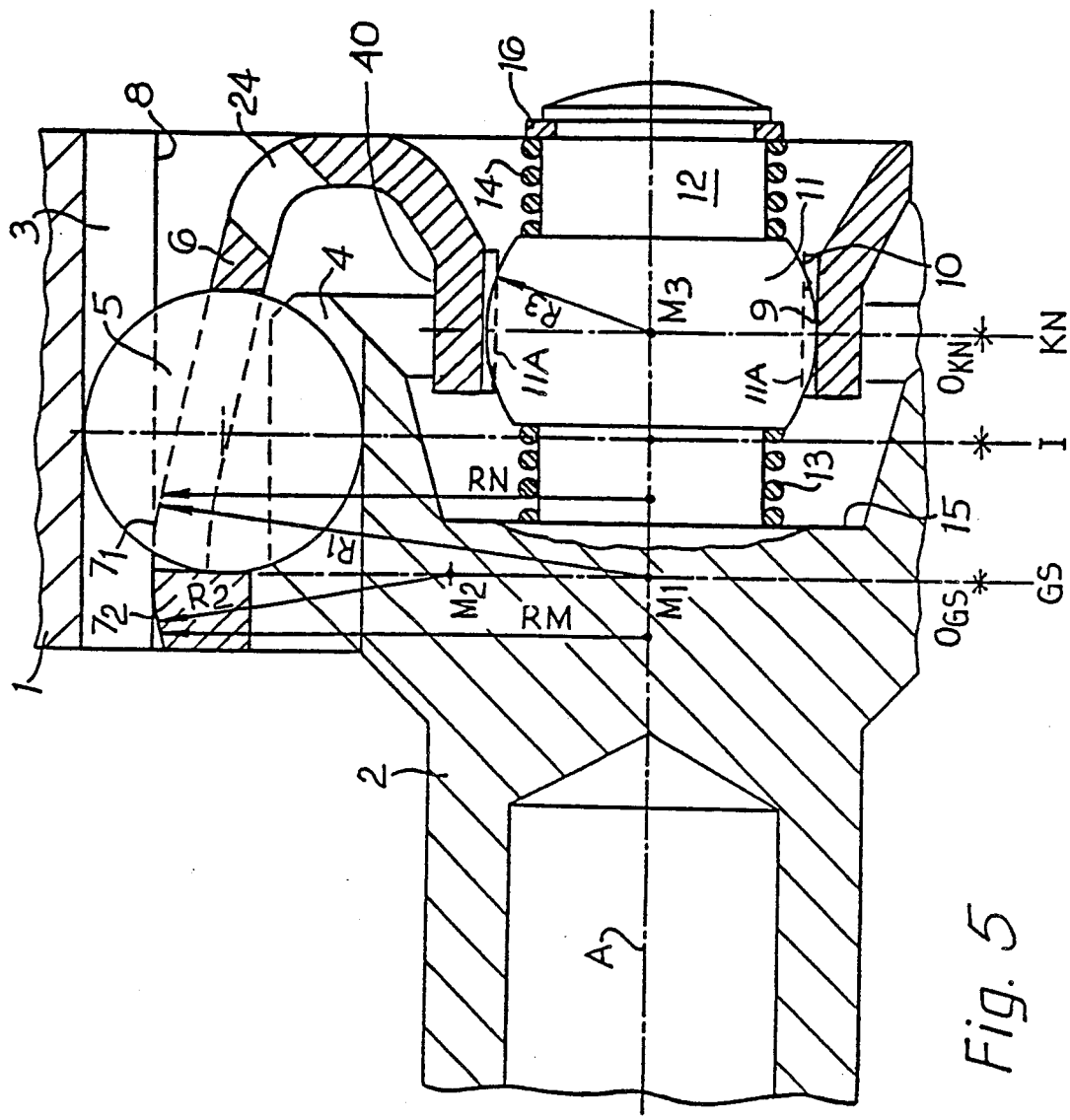
FIG. 5 shows an alternative embodiment of the cage, in a view similar to FIG. 1.

Referring now to FIG. 5 of the drawings, this also shows an alternative configuration of the part of the cage provided with the second control surface 9. As shown in broken lines at 40, a cage of sheet metal may be provided with a cylindrical portion which is formed with circumferentially spaced indentations which are provided with respective portions of the part-spherical surface 9. The arrangement is analogous to the provision of the indentations 26 shown in the embodiment of sheet metal cage in FIG. 3A.

Referring now to FIG. 4 of the drawings, this shows four different ways in which at least one of the facing pairs of tracks in the inner and outer joint member may be configured in order to centre the cage relative to at least one of the joint members. It will be appreciated that all the pairs of tracks in the joint will not be of the configurations hereafter described, and the other tracks will have their centre lines extending parallel to the axes of the joint members wherein the tracks are provided.

Figure 4A:
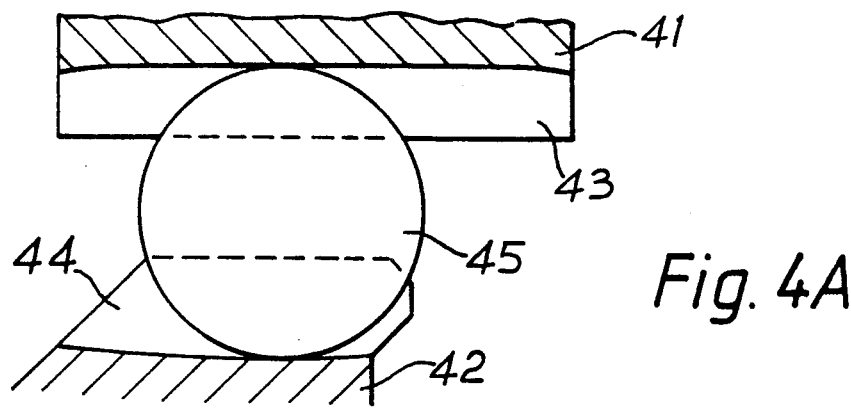
FIGS. 4A–4D show, diagrammatically, four possible configurations of an opposed pair of tracks in the joint member.

FIG. 4A shows an outer joint member 41 and an inner joint member 42, with tracks 43, 44 therein. A ball 45 is shown engaged in the tracks, but the cage of the joint is omitted from the drawing. The depth of each of the tracks 43, 44 is seen to decrease slightly as the ends of the tracks are approached, so that the tendency is always, when the joint is in the middle of its range of plunging movement, for the ball to engage the central part of each track. It will be appreciated that the decrease in depth of the tracks is very small and has been exaggerated for the purpose of the illustration, otherwise there would be a danger of the ball becoming jammed in the tracks.

Figure 4B:
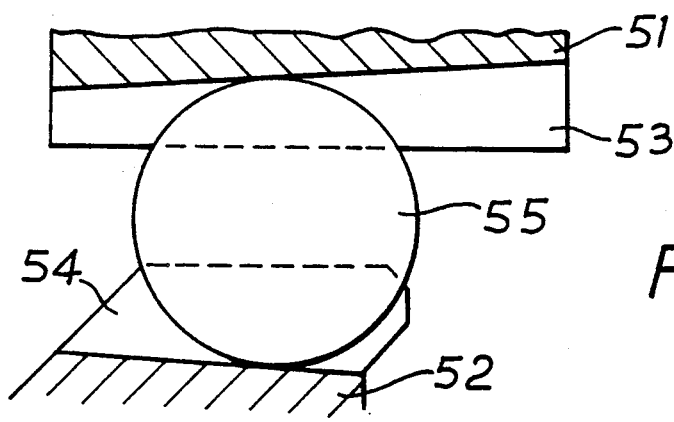

FIG. 4B shows inner and outer joint members 51, 52, and tracks 53, 54 therein engaged by a ball 55. The centre lines of the tracks 53, 54 are straight and lie in respective planes containing the axes of rotation of the relevant joint members, but are inclined to such axes so that they diverge from one another.

Figure 4C:
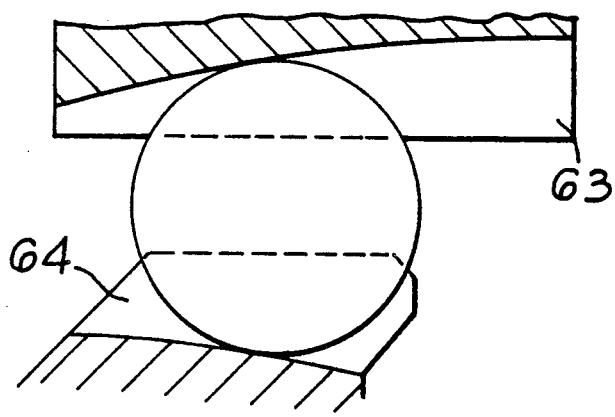

FIG. 4C shows a modification wherein the centre lines of a facing pair of tracks 63, 64 are curved lines whose curvatures are mirror images of one another about the ball centre plane. It will be appreciated that another pair of tracks will have to diverge in the opposite direction axially of the joint, so that the cage is properly centred relative to the joint members.

Figure 4D:
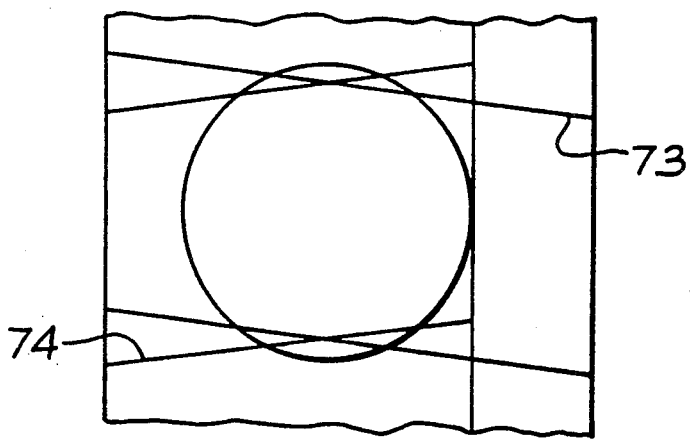

FIG. 4D shows a developed view of part of the joint, in the non-articulated condition, wherein it will be seen that a facing pair of tracks 73, 74 in the outer and inner joint members are equally and oppositely inclined to the joint axis.

The adoption of any of the above configurations for some of the tracks in the joint members will remove the necessity for providing the spring means 13, 14 for centering the cage relative to the joint members, such as is shown in FIG. 1.

We claim:

1. A plunging constant velocity ratio universal joint, comprising:
   an outer joint member having an internal cylindrical surface provided with a number of tracks spaced circumferentially about a rotational axis of the joint member;
   an inner joint member provided with a number of tracks spaced circumferentially about a rotational axis of the inner joint member, facing the tracks in the outer joint member in pairs;
   a plurality of balls for torque transmission between the joint members, disposed one in each facing pair of said tracks;
   and a cage having an axis and disposed between the joint members and holding the balls so that their centres lie in a ball centre plane, the cage having a first control surface which is in sliding engagement with the internal cylindrical surface of the outer joint member, and is a surface of revolution about the cage axis of a curved line with a centre of curvature axially offset from the ball centre plane, the cage further having a second control surface which is in sliding engagement with a surface associated with the inner joint member and is a surface of revolution about the cage axis of a curved line with a centre of curvature offset from the ball centre plane on the opposite side thereof from the first control surface, the said offset of the first control surface being greater than the said offset of the second control surface;
   wherein the first control surface of the cage comprises a first portion, adjacent the ball centre plane, which is part-spherical, and a second portion extending from the first portion towards the end of the cage away from the ball centre plane, on which second portion all points are at distances from the cage axis less than the distances from the cage axis of corresponding points on a theoretical continuation of the first said surface portion towards the end of the cage.

2. A joint according to claim 1 wherein the first control surface of the cage is a surface of revolution about the axis of the cage of an arcuate line with a radius of curvature less than the radius of curvature of the first surface portion, and whose centre of curvature is the same axial distance from the ball centre plane as the centre of curvature of the first surface portion.

3. A joint according to claim 1 wherein the first portion of the first control surface extends as far as a plane, perpendicular to the cage axis, at which the distance of a point on said first portion from the cage axis is equal to the radius of curvature of said first portion, and the second portion of the first control surface extends from said plane as a continuation of said first portion.

4. A joint according to claim 1 wherein said second control surface of the cage is a part-spherical internal surface, engaging a complementary external surface of an intermediate member which is axially movably received on a journal projection of the inner joint member.

5. A joint according to claim 4 wherein, for the purpose of being introduced into the cage, the externally part-spherical face of the intermediate member comprises flattened portions arranged opposite each other.

6. A joint according to claim 4 wherein, for the purpose of permitting introduction of the intermediate member, the part-spherical surface of the cage comprises recesses arranged opposite each other.

7. A joint according to claim 1 wherein said second control surface of the cage is an external part-spherical surface engaging for axially slidable movement in an internal cylindrical formation of the inner joint member.

8. A joint according to claim 1 comprising spring means supporting the cage against movement in both axial directions relative to one of the joint member.

9. A joint according to claim 1 wherein at least one track in a joint member has a depth which decreases towards the ends of the track, for centering the cage relative to the respective joint member.

10. A joint according to claim 1 wherein the centre lines of the tracks of at least one facing pair thereof in the inner and outer joint members are, in developed view of the joint, equally and oppositely inclined to the joint axis.

11. A joint according to claim 1 wherein the centre lines of the tracks of at least one facing pair thereof lie in planes containing the axes of the respective joint members, and are equally and oppositely inclined to such axes so that they diverge from one another.

12. A joint according to claim 1 wherein the centre lines of at least part of the tracks of at least one facing pair thereof lie in planes containing the axes of the respective joint members, and comprise curved lines whose curvatures are mirror images of one another.

13. A joint according to claim 1 wherein the cage and the inner joint member have complementary part-spherical stop surfaces to limit axial movement of the cage in both directions relative to the inner joint member.

14. A joint according to claim 1 wherein the cage comprises a sheet metal member of substantially constant wall thickness.

15. A joint according to claim 14 wherein the cage has, in its portion having the first control surface, circumferentially distributed indentations extending inwardly as far as the ball centre.

16. A joint according to claim 14 wherein the cage includes radial tongues which are bent in opposite axial directions and which have end faces formed as portions of the second control surface of the cage.

17. A joint according to claim 14 wherein the cage comprises a cylindrical portion having circumferentially distributed indentations which provide portions of the second control surface of the cage.

18. A joint according to claim 1 wherein the cage comprises apertures for flow of lubricant through the cage.

* * * * *